US00RE40870E

(19) United States
(12) Reissued Patent
Magnusson et al.

(10) Patent Number: US RE40,870 E
(45) Date of Reissued Patent: Aug. 18, 2009

(54) ADJUSTING ELEMENT DEVICE

(75) Inventors: Goran Magnusson, Amal (SE); Leif Bengtsson, Saffle (SE)

(73) Assignee: Reac AB, Amal (SE)

(21) Appl. No.: 12/149,956

(22) Filed: May 9, 2008

Related U.S. Patent Documents

Reissue of:
(64) Patent No.: 7,284,458
Issued: Oct. 23, 2007
Appl. No.: 10/816,921
Filed: Apr. 5, 2004

(30) Foreign Application Priority Data

Apr. 8, 2003 (SE) ..... 0301064

(51) Int. Cl.
*F16H 35/06* (2006.01)
*F16H 57/00* (2006.01)

(52) U.S. Cl. ..... 74/25; 74/89.14; 74/396; 74/606 R; 74/89.23

(58) Field of Classification Search ..... 74/89.14, 74/89.2, 89.21, 89.22, 89.23, 395–397, 425, 74/606 R
See application file for complete search history.

(56) References Cited

U.S. PATENT DOCUMENTS

| | | | |
|---|---|---|---|
| 2,778,239 | A | 1/1957 | Hoover |
| 2,869,386 | A | 1/1959 | Hoover |
| 3,090,631 | A | 5/1963 | Hoover |
| 3,142,998 | A | 8/1964 | Pickles |
| 3,454,061 | A | 7/1969 | Okoniewski et al. |
| 3,559,499 | A | 2/1971 | Profet |
| 4,747,319 | A | 5/1988 | Sakuta |
| 5,901,610 | A | 5/1999 | Schneider |

FOREIGN PATENT DOCUMENTS

| | | |
|---|---|---|
| DE | 199 55 455 | 5/2001 |
| EP | 0 840 425 | 5/1998 |
| EP | 1 076 399 | 2/2001 |
| GB | 592 735 | 9/1947 |
| JP | 2002-340126 | 11/2002 |

*Primary Examiner*—William C Joyce
(74) *Attorney, Agent, or Firm*—Dickstein Shapiro LLP

(57) ABSTRACT

A device to be used with an adjusting element comprising a rod piston (3) displaceable with the aid of a motor (4) in a piston tube (2). The motor (4) is rotatably arranged at the adjusting element (1) through a worm gear (6), either directly or through a motor attachment (5), wherein the motor (4) extends in an extension plane in parallel with the piston tube (2), said worm gear (6) having a throat formation (7) for axial fixation of the position of the motor (4) in the adjusting element (1) while a free rotation of the motor (4) is practicable through 360° in order to make possible, in applications with limited space, an eligible position fixation of the motor (4) in a predetermined angle in relation to the adjusting element (1).

5 Claims, 2 Drawing Sheets

ADJUSTING ELEMENT DEVICE

Figure 1:
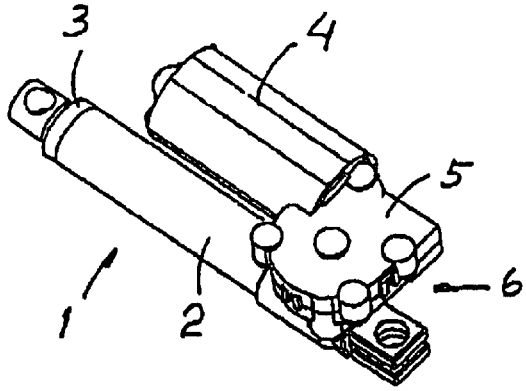

Matter enclosed in heavy brackets [ ] appears in the original patent but forms no part of this reissue specification; matter printed in italics indicates the additions made by reissue.

FIELD OF INVENTION

The present invention relates to a device to be used with an adjusting element comprising a rod piston displaceable in a piston tube with the aid of a motor.

TECHNICAL BACKGROUND

The most common type of motor controlled adjusting elements on the market today mostly have the motor arranged in line with the longitudinal direction of the adjusting means. Alternatively, the longitudinal direction of the motor can be displaced in relation to that of the adjusting element, but still in parallel therewith. Other solutions have adjusting elements with a rotatable motor support and in these cases the motor has to be dismounted from the adjusting means in order to provide another angle between these units, for example depending on lack of space at the installation spot. Then an assembly plate has been used between the motor and the piston tube. In this case it has been necessary to unscrew the motor in order to rotate it e.g. through 120° in the exiting partition between the screws. The assembly plate can also be reversible towards the piston tube in order to obtain e.g. six different angle positions between motor and adjusting element. According to known solutions, also the rear attachment of the adjusting element have fixed positions such as with splines against the gear housing or corresponding means. However, also in these cases the adjusting element has to be disassembled in order to allow a change of the installation angles of the adjusting means.

SUMMARY OF THE INVENTION

The object of the present invention is to eliminate these drawbacks and provide an adjusting element with a rotatably mounted motor, where the angle between the adjusting element and the motor is eligibly adjustable through 360° and wherein the adjusting element and the motor then can be arrested in each desired position. The characterizing features of the invention are indicated in the accompanying claims.

Thanks to the invention a device is now provided, which excellently fulfils its object while at the same time the solution is both easy and inexpensive to realize. With the invention the adjusting element can now be used in applications with a limited space, since the adjusting element and the motor are mutually rotatable. Since the motor and worm gear of this type of adjusting element take up a considerable part of the actual volume, it is a great advantage to be able to place this volume in any way the installation allows, i.e. that the motor can be freely rotated over 360° and can be arrested in any desired position. Even the rear attachment of the adjusting element is adapted to facilitate the mounting in narrow installations and therefore also the rear attachment of the adjusting element can be freely rotatable through 360° and be lockable in each desired angular position.

SHORT DESCRIPTION OF THE DRAWINGS

Figure 2:
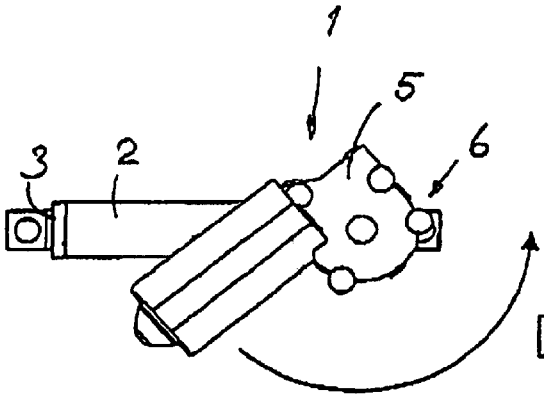
Figure 3:
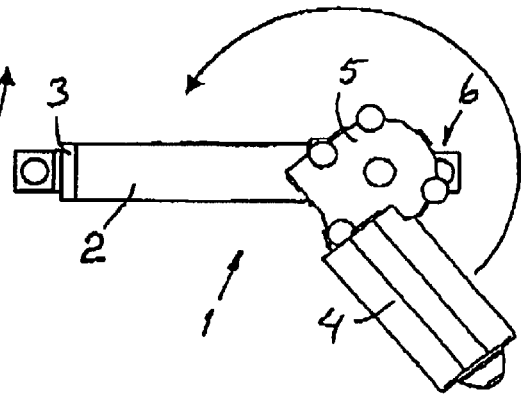
Figure 4:
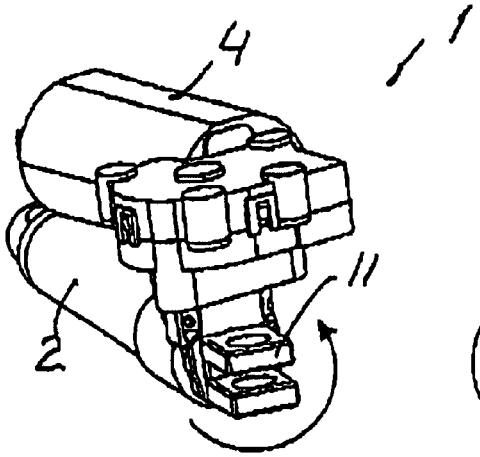
Figure 5:
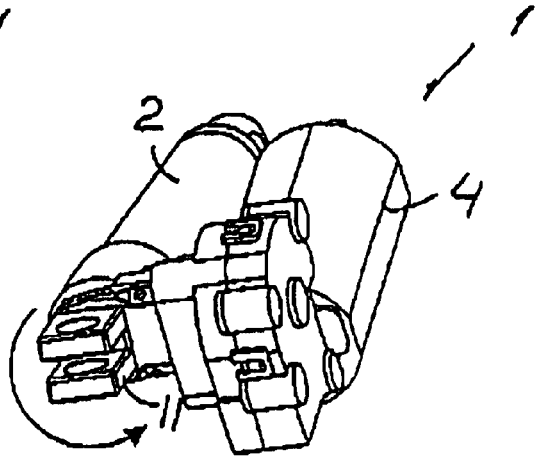
Figure 6:
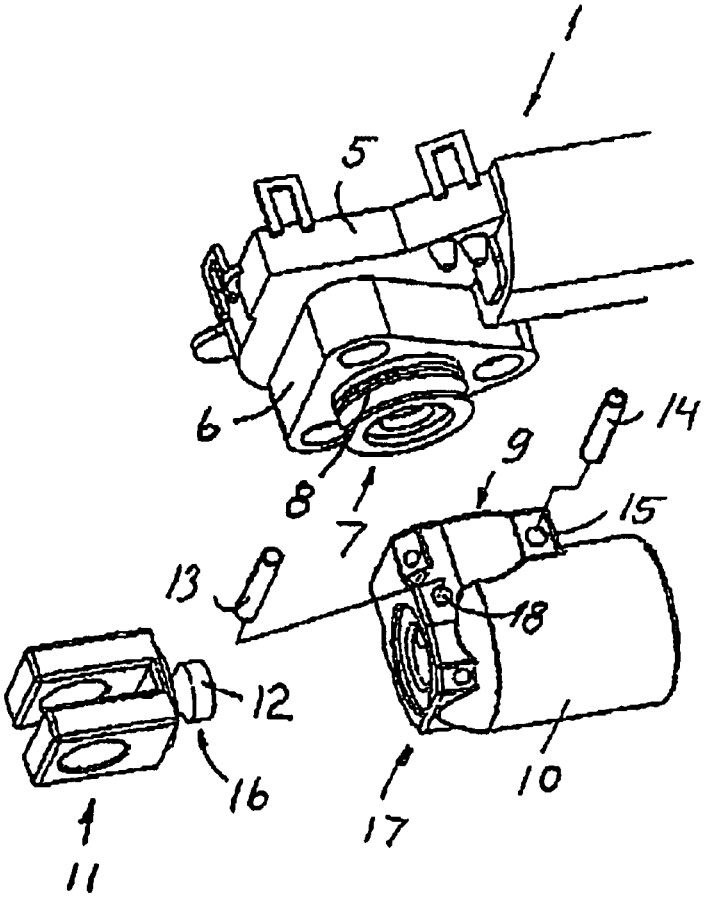

The invention will now be described more in detail below with reference to a preferred embodiment illustrated in the attached drawings, on which FIG. 1 shows a schematical perspective view of an adjusting element with a rotatably mounted motor and a rear attachment according to the present invention, FIG. 2 shows another view from above of the adjusting element depicted in FIG. 1, wherein an arrow shows hows the motor can be rotated, FIG. 3 shows a view similar to FIG. 2, where the motor has been rotated somewhat during its rotation through 360° in relation to the adjusting element, FIG. 4 shows a schematical perspective view from the rear attachment of the adjusting element, which view also shows the possibilities for rotation of the rear attachment, FIG. 5 shows another end view of the adjusting element shown in FIG. 4, wherein the motor has been rotated about the rear attachment through a given angle, and FIG. 6 shows an exploded perspective view of the adjusting element with a rotatably mounted motor according to the present invention and which view illustrates schematically how the motor is rotatably mounted at the adjusting element and how the rear attachment of the adjusting element is rotatably attached at the gear housing of the adjusting element.

DETAILED DESCRIPTION OF PREFERRED EMBODIMENTS

As is evident from the drawings a preferred embodiment of an adjusting element 1 is shown with a rotatably mounted motor 4, either rotatable through a worm gear 6 or indirectly through a motor attachment 5 between the worm gear 6 and the motor 4. The adjusting element 1 comprises a rod piston 3 displaceable with the aid of the motor 4 in a piston tube 2. In the example shown the motor 4 at the adjusting element 1 is supported through a worm gear 6 and a motor attachment 5. The motor 4 extends in an extension plane in parallel with the rod piston 2 at a short distance from the adjusting element 1. The worm gear 6 has a throat formation 7 for axial fixation of the position of the motor 4 at the adjusting element 1. With this kind of mounting of the motor 4 at the adjusting element 1 a free rotation of the motor 4 through 360° in relation to the adjusting element 1 is achieved. This is, as already mentioned in the preamble, a great advantage in applications with limited space and with this solution one can achieve an eligible fixation of the position of the motor 4 in relation to the adjusting element 1 at a predetermined angle in relation thereto.

The throat formation 7 of the worm gear 6 has a circumferentially extending groove 8, which is intended for cooperation with a locking pin 14 for the fixation of the throat formation 7 in a gear housing 10 sitting at an attachment portion 9 of the adjusting element 1. In the example shown, the throat formation 7 can be attached perpendicularly in the gear housing 10, which comprises an angular gearing for cooperation with a screw thread in the adjusting element 1 and a gear in the worm gear 6, respectively. The worm gear 6 can thus be positioned fixedly in the gear housing 10 and can be locked in place by the locking pin 14, which runs in the groove in the throat formation 7 and through bores 15 in the gear housing 10. This montage allows for rotation of the motor 4 while it at the same time is axially locked in the rotation shaft. The locking of the rotation is accomplished with the aid of two locking screws, not shown in the drawing.

The rear attachment 11 is attached in the same way at the gear housing 10 with the aid of a locking pin 13. The attachment 11 too is locked against rotation with the aid of locking screws, not shown in the drawing. The rear attachment 11 can thus be oriented into the desired position through rotation at the free end of the gear housing 10, i.e. at the attachment portion of the adjusting element 1, and also this attachment 11 has a fixation throat 12 having a groove, which can be rotated in a recess 11 in the gear housing 10 and is detained therein with at least one locking pin 13 cooperating with the bores 18 in the housing 10 and the groove 16 in the fixation throat 12 in association with the recess 17.

The invention claimed is:

1. A device to be used with an adjusting element comprising a rod piston (3) displaceable in a piston tube (2) with the aid of a motor (4), characterized in that the motor (4) is rotatably arranged at the adjusting element (1) through a worm gear housing (6), either directly or through a motor attachment (5), wherein the motor (4) extends in an extension plane in parallel with the piston tube (2), said worm gear housing (6) having a throat formation (7) for axial fixation of the position of the motor (4) in the adjusting element (1) while a free rotation of the motor (4) is practicable through 360° in the extension plan in order to make possible, in applications with limited space, an eligible position fixation of the motor (4) at a predetermined angle in relation to the adjusting element (1).

2. A device according to claim 1, characterized in that the throat formation (7) of the worm gear housing (6) can be fixed perpendicular in relation to the adjusting element (1) in a gear housing (10) at the attachment portion (9) of the adjusting element.

3. A device according to claim 1, characterized in that the throat formation (7) of the worm gear housing (6) has a circumferentially surrounding groove (8) for cooperation with at least one locking pin (14) at the fixation of the adjusting element (1) at the throat formation (7) and which locking pin (14) at the same time extends through bores (15) in the gear housing (10) of the adjusting element (1).

4. A device according to claim 1, characterized in that the attachment portion (9) of the adjusting element (1) has a rotatable, rear attachment (11) the position of which can be locked.

5. A device according to claim 4, characterized in that the rear attachment (11) of the adjusting element (1) has a fixation throat (12) provided with a groove, which can rotate in a recess (17) in a gear housing (10) and the position of which can be locked, while at the same time the attachment (11) can be axially locked in this recess by at least one locking pin (13) cooperating with the groove (16) of the throat (12) and bores (18) in the gear housing (10) in association with the recess (17).

* * * * *